(12) United States Patent
Schmidt

(10) Patent No.: US 10,194,575 B2
(45) Date of Patent: Feb. 5, 2019

(54) SYSTEM AND METHOD FOR AUTOMATICALLY GENERATING VEHICLE GUIDANCE WAYPOINTS AND WAYLINES

(71) Applicant: AGCO Corporation, Hesston, KS (US)

(72) Inventor: Lee A. Schmidt, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/033,849

(22) PCT Filed: Nov. 14, 2014

(86) PCT No.: PCT/US2014/065733
§ 371 (c)(1),
(2) Date: May 2, 2016

(87) PCT Pub. No.: WO2015/073844
PCT Pub. Date: May 21, 2015

(65) Prior Publication Data
US 2016/0274587 A1    Sep. 22, 2016

Related U.S. Application Data

(60) Provisional application No. 61/905,525, filed on Nov. 18, 2013, provisional application No. 61/905,892, filed on Nov. 19, 2013.

(51) Int. Cl.
| | |
|---|---|
| *A01B 69/00* | (2006.01) |
| *G01C 21/00* | (2006.01) |
| *A01B 69/04* | (2006.01) |
| *G05D 1/02* | (2006.01) |
| *B60K 35/00* | (2006.01) |

(Continued)

(52) U.S. Cl.
CPC ............ *A01B 69/008* (2013.01); *A01B 69/00* (2013.01); *B60K 35/00* (2013.01); *G01C 21/00* (2013.01);
(Continued)

(58) Field of Classification Search
CPC ........ A01B 69/04; A01B 76/00; G01C 21/00; G01C 21/20; G05D 1/00
USPC ............................. 701/26, 28, 467, 532, 533
See application file for complete search history.

(56) References Cited

U.S. PATENT DOCUMENTS

| | | | |
|---|---|---|---|
| 6,236,924 B1 * | 5/2001 | Motz ................... | A01B 69/008 172/4.5 |
| 9,760,094 B2 * | 9/2017 | Saad ................... | G05D 1/0295 |

(Continued)

FOREIGN PATENT DOCUMENTS

WO    2000/10063 A1    2/2000

OTHER PUBLICATIONS

European Patent Office, International Search Report for International Patent Application No. PCT/US2014/065733, dated Feb. 2, 2015.

*Primary Examiner* — Thomas G Black
*Assistant Examiner* — Wae L Louie

(57) ABSTRACT

A guidance system for a mobile machine includes a location determining device for determining a location of the machine, a user interface and a controller. The controller is configured to receive location information from the location determining device, detect a path followed by the machine using the location information, present a plurality of preliminary waypoints to a user via the user interface, receive waypoint information from the user via the user interface indicating one or more selected waypoints corresponding to one or more of the preliminary waypoints, and automatically guide the machine using the one or more selected waypoints. The controller may automatically generate the plurality of preliminary waypoints as the machine traverses the path.

20 Claims, 13 Drawing Sheets

(51) Int. Cl.
*G05D 1/00* (2006.01)
*G01C 21/34* (2006.01)
*G01C 21/36* (2006.01)
*G06F 3/0488* (2013.01)
*B62D 49/06* (2006.01)
*G06F 3/0482* (2013.01)

(52) U.S. Cl.
CPC ....... *G01C 21/343* (2013.01); *G01C 21/3626* (2013.01); *G01C 21/3664* (2013.01); *G05D 1/0088* (2013.01); *G05D 1/0219* (2013.01); *G05D 1/0274* (2013.01); *G05D 1/0278* (2013.01); *G06F 3/0488* (2013.01); *B60K 2350/1004* (2013.01); *B62D 49/06* (2013.01); *G05D 2201/0201* (2013.01); *G06F 3/0482* (2013.01)

(56) References Cited

U.S. PATENT DOCUMENTS

| | | | | |
|---|---|---|---|---|
| 2008/0269956 A1* | 10/2008 | Dix | ...................... | A01B 69/008 701/1 |
| 2010/0018726 A1* | 1/2010 | Chiocco | ............... | A01B 69/008 172/1 |
| 2011/0160994 A1* | 6/2011 | Schmidt | ............... | A01B 79/005 701/532 |
| 2011/0196565 A1* | 8/2011 | Collins | ............... | A01B 69/007 701/26 |
| 2011/0231061 A1* | 9/2011 | Reeve | .................. | A01B 69/008 701/41 |
| 2015/0142308 A1* | 5/2015 | Schmidt | ................. | G01C 21/00 701/467 |
| 2015/0201549 A1* | 7/2015 | Baurer | .................. | A01C 7/105 111/171 |
| 2016/0029545 A1* | 2/2016 | Matthews | ........... | A01B 69/008 701/28 |
| 2016/0146611 A1* | 5/2016 | Matthews | ........... | G05D 1/0297 701/533 |
| 2016/0360697 A1* | 12/2016 | Diaz | .................... | G05D 1/0061 |
| 2016/0366815 A1* | 12/2016 | Guyette | ................ | G01C 21/165 |
| 2017/0060134 A1* | 3/2017 | Buhler | ................. | A01B 79/005 |
| 2017/0083026 A1* | 3/2017 | Schmidt | ................. | H04L 67/12 |
| 2017/0088147 A1* | 3/2017 | Tentinger | ............... | B60K 35/00 |
| 2017/0090741 A1* | 3/2017 | Tentinger | ................. | G06F 8/38 |
| 2017/0223888 A1* | 8/2017 | Matthews | ........... | A01B 69/008 |

* cited by examiner

SYSTEM AND METHOD FOR AUTOMATICALLY GENERATING VEHICLE GUIDANCE WAYPOINTS AND WAYLINES

FIELD

Embodiments of the present invention relate to automated vehicle guidance. More specifically, embodiments of the invention relate to the use of waypoints and waylines in automated vehicle guidance.

BACKGROUND

Mobile machinery, such as agricultural and construction machinery, commonly use automated guidance systems to assist users in operating the machines. In particular, automated guidance systems may be used to steer machines in order to, for example, steer the machines along a precise path. In the field of agriculture, automated guidance systems are commonly installed on tractors, self-propelled applicators and harvesters, for example, to automatically steer these machines while working or harvesting a field. Automated steering allows the machine operator to monitor and respond to other aspects of machine status and performance. Automated guidance is especially important when machines are working large and/or unusually-shaped fields, where guidance systems can maximize efficiency by selecting a travel course or pattern that minimizes time in the field. This reduces the cost of fuel and the amount of time an operator spends in the machine.

When operating a machine equipped with an automated guidance system, the operator typically defines the working area. This may be done by manually guiding the machine around the working area thereby enabling the guidance system to define a boundary of the area. The operator may then employ the automated guidance system to steer the machine along consecutive paths within the boundary to work the working area.

The above section provides background information related to the present disclosure which is not necessarily prior art.

SUMMARY

A guidance system constructed in accordance with an embodiment of the present invention comprises a location determining device for determining a location of the machine, a user interface and a controller. The controller is configured to receive location information from the location determining device, detect a path followed by the machine using the location information, present a plurality of preliminary waypoints to a user via the user interface, receive waypoint information from the user via the user interface indicating one or more selected waypoints corresponding to one or more of the preliminary waypoints, and automatically guide the machine using the one or more selected waypoints.

An agricultural machine constructed in accordance with another embodiment of the invention comprises a location determining device for determining a location of the vehicle, a user interface including a display, and a controller. The controller is configured to receive location information from the location determining device, detect a path followed by the agricultural machine using the location information and automatically generate a plurality of suggested waypoints associated with the path as the vehicle travels the path. The controller is further configured to present the suggested waypoints to a user as a visual representation on the display as the vehicle travels the path, receive waypoint information from the user via the user interface indicating two of the suggested waypoints as selected waypoints, and automatically guide the machine using the selected waypoints.

A guidance system constructed in accordance with another embodiment of the invention comprises a user interface and a controller. The controller is configured to receive boundary information indicating a boundary of an area to be worked by the agricultural machine, automatically generate a plurality of suggested waypoints associated with the boundary, present the suggested waypoints to a user via the user interface, receive waypoint information from the user via the user interface indicating one or more selected waypoints corresponding to one or more of the suggested waypoints, and automatically guide the machine using the one or more selected waypoints.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

Figure 1:
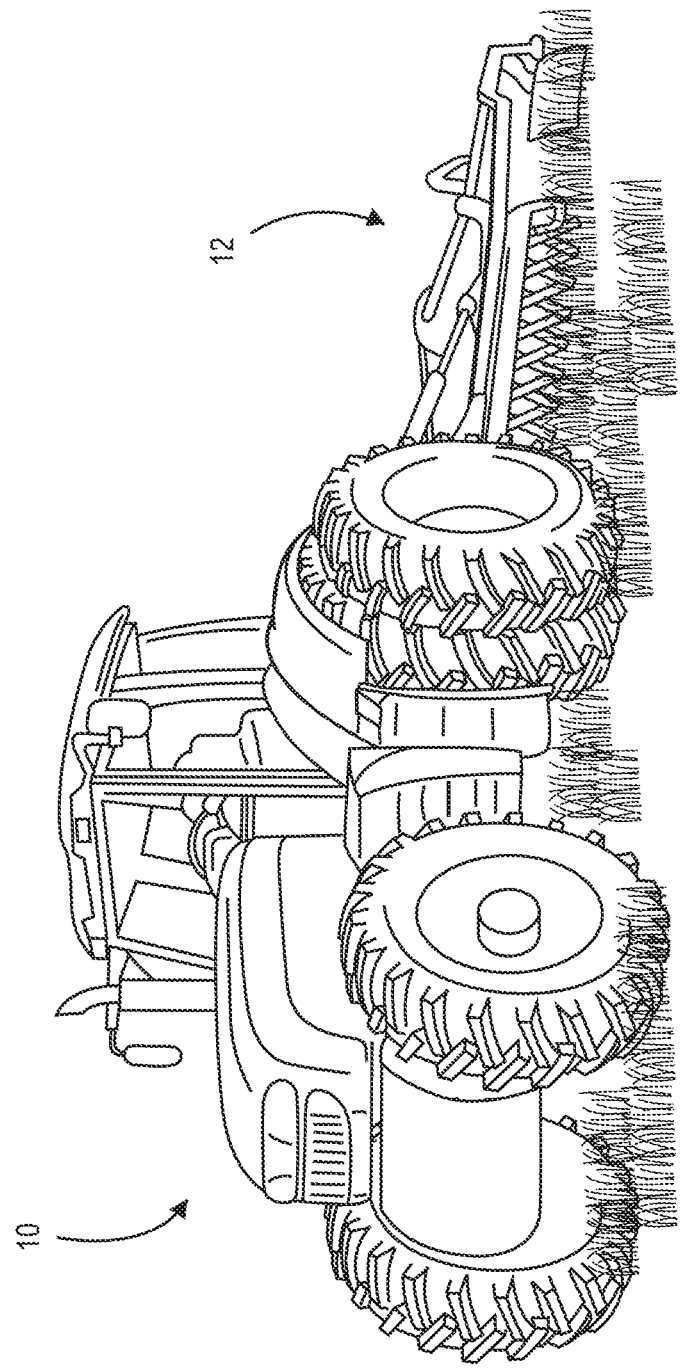
FIG. 1 is a perspective view of an exemplary tractor and implement which may be equipped with an automated guidance system incorporating principles of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etcetera described in one embodiment may also be included in other embodiments, but is not necessarily included. Thus, the present technology can include a variety of combinations and/or integrations of the embodiments described herein.

Turning now to the drawing figures, an exemplary tractor 10 equipped with an automated guidance system incorporating principles of the present invention is illustrated in FIG. 1. The automated guidance system may be used to guide the tractor 10 as the tractor pulls or carries an implement 12 while working a field. While specific reference is made herein to the tractor 10 for purposes of illustration, guidance systems employing principles of the present invention may be used with other machines including, for example, other agricultural machines such as combine harvesters as well as machines used in the other industries, including the construction industry.

In some embodiments of the invention, the automated guidance system is operable to automatically generate suggested waypoints as the tractor 10 travels a path associated with a field or other area to be worked by the tractor. The automated guidance system may generate a plurality of suggested waypoints exceeding the number of waypoints needed for automated guidance such that the user may manually select a subset of the waypoints for use in automated guidance. In other embodiments of the invention, the automated guidance system is operable to place waypoints on the path as indicated by an operator. The suggested waypoints are points or locations on the path that may be used by the automated guidance system as points of reference as the tractor works or travels the field, as explained below in greater detail.

Figure 2:
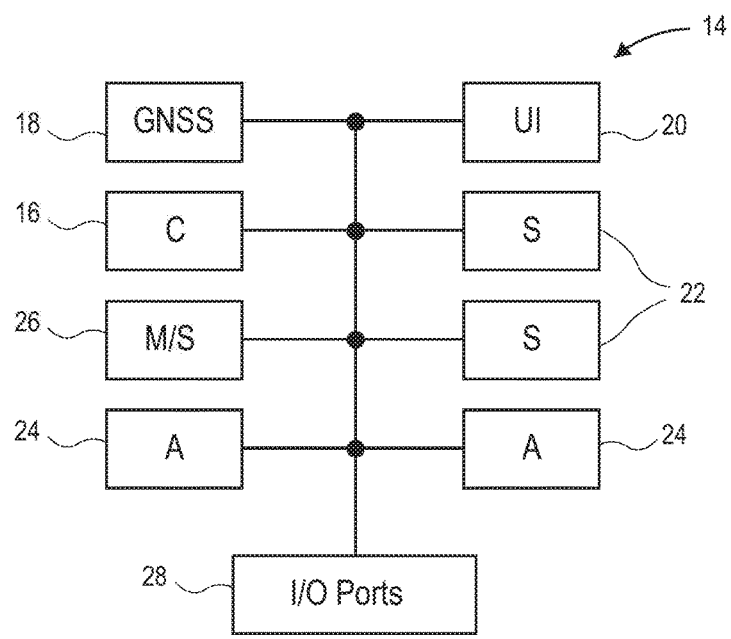
FIG. 2 is a block diagram of certain components of an automated guidance system incorporating principles of the present invention.

Certain components of an exemplary automated guidance system 14 are illustrated in FIG. 2. The system 14 broadly includes a controller 16, a position determining device 18, a user interface 20, one or more sensors 22, one or more actuators 24, one or more memory/storage components 26, and one or more input/out ports 28. The position determining device 18 may be a global navigation satellite system (GNSS) receiver, such as a device configured to receive signals from one or more positioning systems, such as the United States' global positioning system (GPS) and/or the Russian GLONASS system, and to determine a location using the received signals. The user interface 20 includes components for receiving instructions or other input from a user and may include buttons, switches, dials, and microphones, as well as components for presenting information or data to users, such as displays, light-emitting diodes, audio speakers and so forth. The user interface 20 may include a touchscreen display capable of presenting visual representations of information or data and receiving instructions or input from the user via a single display surface.

The sensors 22 may be associated with any of various components or functions of the tractor 10 including, for example, various elements of the engine, transmission(s), and hydraulic and electrical systems. The actuators 24 are configured and placed to drive certain functions of the tractor 10 including, for example, steering when an automated steering function is engaged. The actuators 24 may take virtually any form but are generally configured to receive control signals or instructions from the controller 16 (or other component of the system 14) and to generate a mechanical movement or action in response to the control signals or instructions. By way of example, the sensors 22 and actuators 24 may be used in automated steering of the tractor 10 wherein the sensors 22 detect a current position of steered wheels and the actuators 24 drive steering movement of the wheels.

The controller 16 includes one or more integrated circuits programmed or configured to implement the functions described herein. By way of example the controller 16 may be a digital controller and may include one or more general purpose microprocessors or microcontrollers, programmable logic devices, or application specific integrated circuits. The controller 16 may include multiple computing components placed in various different locations. The controller 16 may also include one or more discrete and/or analog circuit components operating in conjunction with the one or more integrated circuits or computing components. Furthermore, the controller 16 may include or have access to one or more memory elements operable to store executable instructions, data, or both. Thus, the memory/storage device may be built into the same device as the controller or may be external.

It will be appreciated that, for simplicity, certain elements and components of the system 14 have been omitted from the present discussion and from the drawing of FIG. 2. A power source or power connector is also associated with the automated guidance system 14, for example, but is conventional in nature and, therefore, is not discussed herein. In one embodiment, all of the components of the automated guidance system 14 are contained on or in the tractor 10. The present invention is not so limited, however, and in other embodiments one or more of the components of the system 14 may be external to the tractor 10. In another embodiment, for example, some of the components of the system 14 are contained on or in the tractor 10 while other components of the system are contained on or in the implement 12. In this embodiment, the components associated with the tractor 10 and the components associated with the implement 12 may communicate via wired or wireless communications according to a local area network such as, for example, a controller area network. The system 14 may be part of a communications and control system conforming to the ISO 11783 (also referred to as "ISOBUS") standard. In yet another exemplary embodiment, one or more components of the system 14 may be located remotely from the tractor 10 and the implement 12. In this embodiment, the system 14 may include wireless communications components for enabling the tractor 10 to communicate with a remote computer, computer network or system.

The system 14 is configured to assist a machine operator by helping identify and place waypoints and waylines used as references by the system 14 during automated guidance of the tractor 10. The controller 16 may automatically generate the waypoints according to features of the travelled path, according to geographic features of the land associated with the path, according to historic practices, and/or according to other factors. The controller 16 may automatically generated the waypoints to correspond to features of the travelled path, such as turns in the path or predetermined intermediate points on path segments. As used herein, an intermediate point on a path segment is a point or location between endpoints of the path segment, wherein the endpoints of the segment may be determined by turns in the path. A predetermined intermediate point on a path segment may be a particular percentage of the distance from a starting point to an ending point of the path segment, such as 10%, 20%, 30%, 40%, 50%, 60% and so forth.

In a first implementation, the system 14 automatically generates waypoints associated with path segment endpoints or path corners as the tractor 10 travels along a generally circuitous path defining a work area. FIGS. 3-11 illustrate an exemplary scenario where this implementation may be used. An operator plans to begin working a field 30 by travelling an intended path 32 around the field 30 to thereby define a working area within the path 32 or otherwise associated with the path 32. Initially there may be no visual indicators of the intended path 32 and, in fact, the path 32 may be arbitrarily created as the operator travels along edges of the field 30 adjacent roads 34, around obstacles, and so forth.

The graphical depictions of the field 30 and guidance elements (e.g., waypoints and waylines) illustrated in FIGS. 3-11 (and other figures) may be part of an exemplary graphical display presented to an operator of the tractor 10 via the user interface 20, such as via a touchscreen. Thus, the graphic display may present a map or depiction of the field 30 as well as additional geographic or cartographic features of the surrounding area, including roads, streams and ponds. The intended path 32 is depicted in these drawings for illustration only and would typically not be presented to the operator via the user interface 20. As explained above, the path 32 may be arbitrarily created by the operator.

Figure 3:
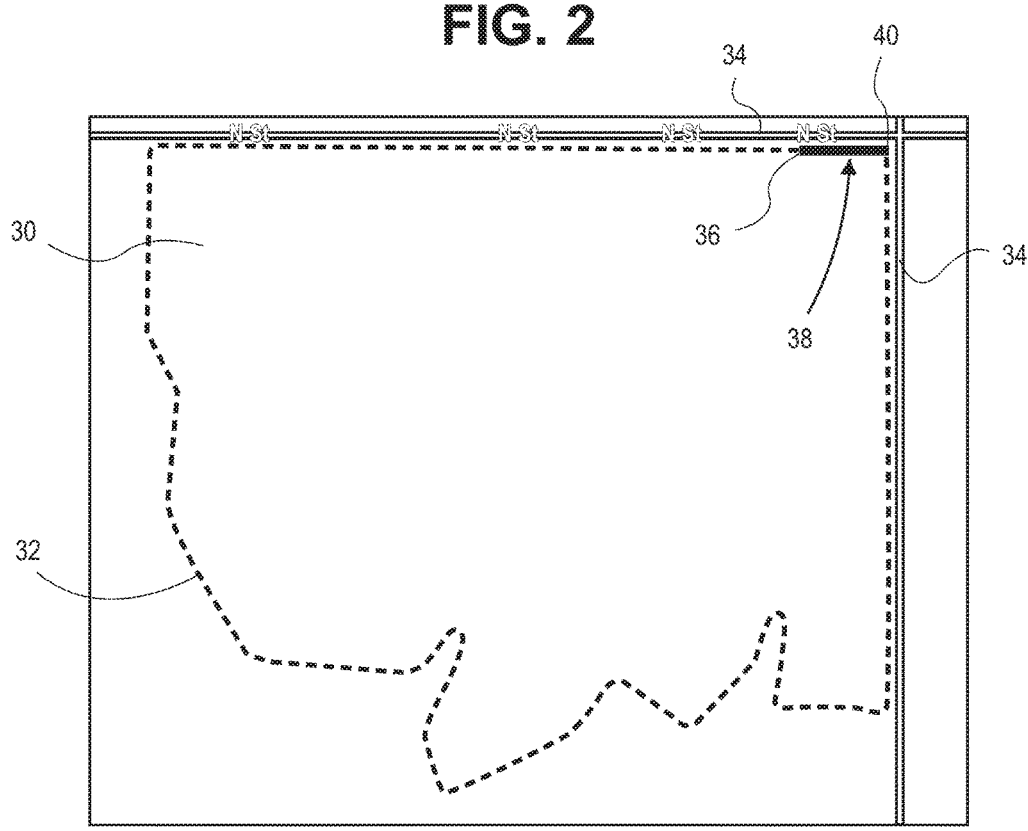
FIGS. 3-11 are exemplary screenshots generated by a user interface of the guidance system of FIG. 2, illustrating the progress of the tractor along a path and suggested waypoints placed on the path by the guidance system.

The operator may begin travelling the intended path 32 at a first location 36 illustrated in FIG. 3. That location 36 may be near an entrance to the field. As the tractor 10 travels the intended path 32 from left to right in FIG. 3 the system 14 tracks the tractor's position and progress, records the path 38 followed by the tractor, and presents a depiction of the path 38 as a solid line. When the tractor 10 makes a first turn corresponding to corner 40, the system 14 detects the turn and associates a first waypoint, waypoint A, with the corner 40 defined by the turn, as illustrated in FIGS. 4 and 5.

Figure 4:
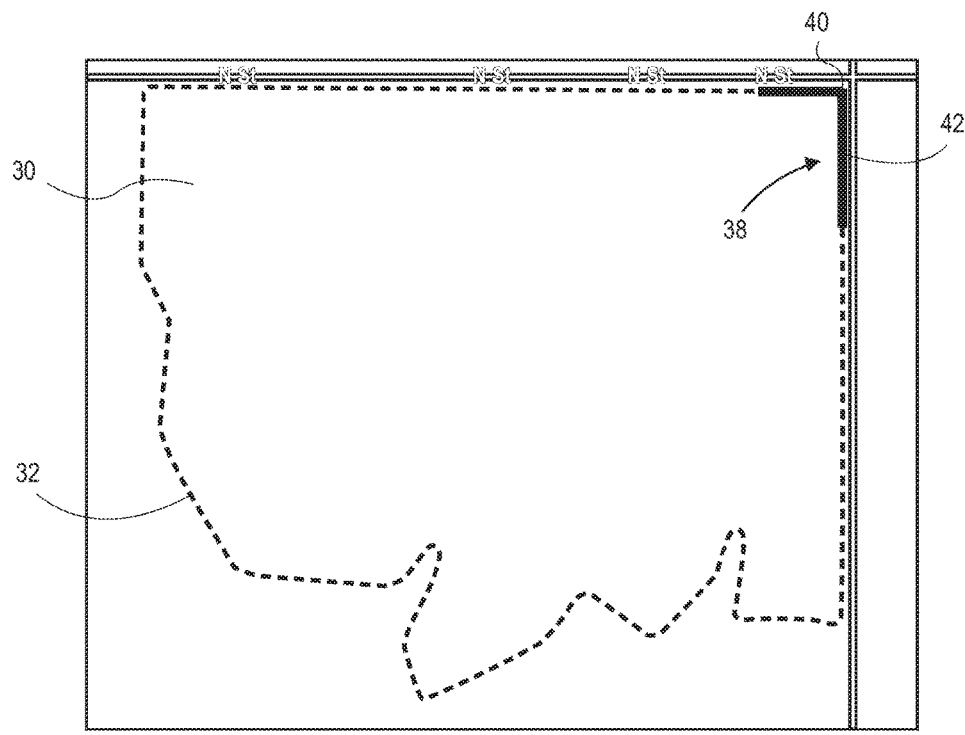
Figure 5:
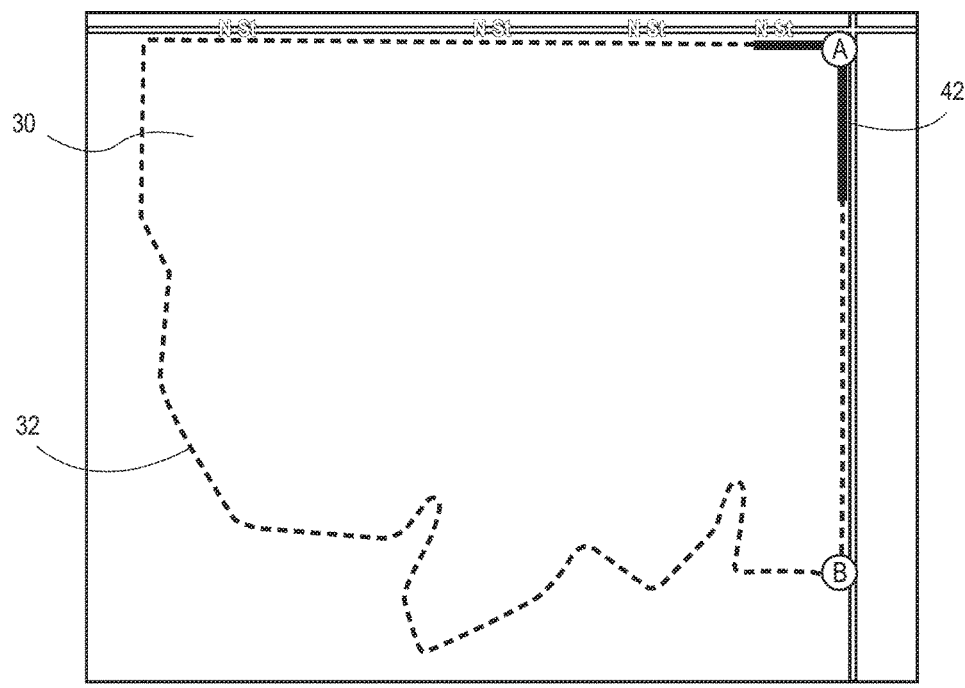
Figure 6:
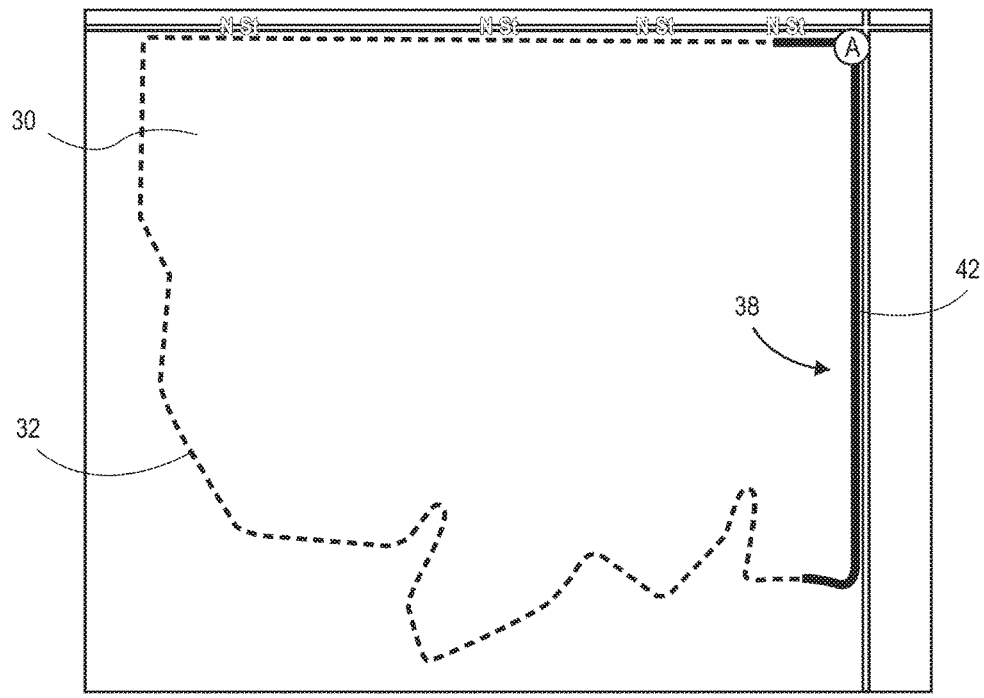
Figure 7:
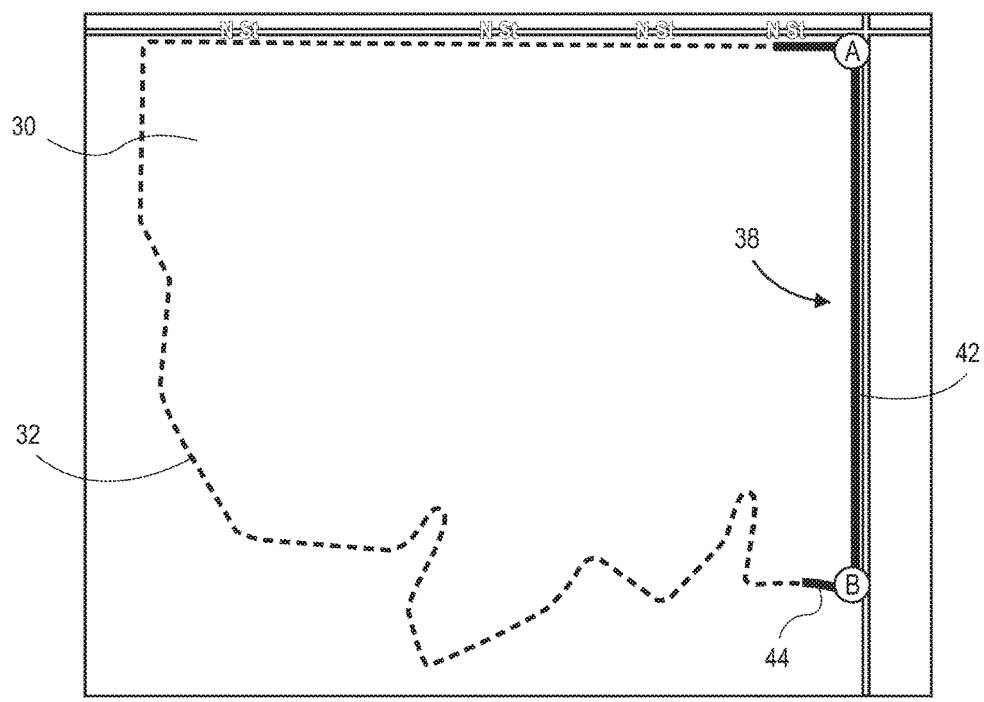
Figure 8:
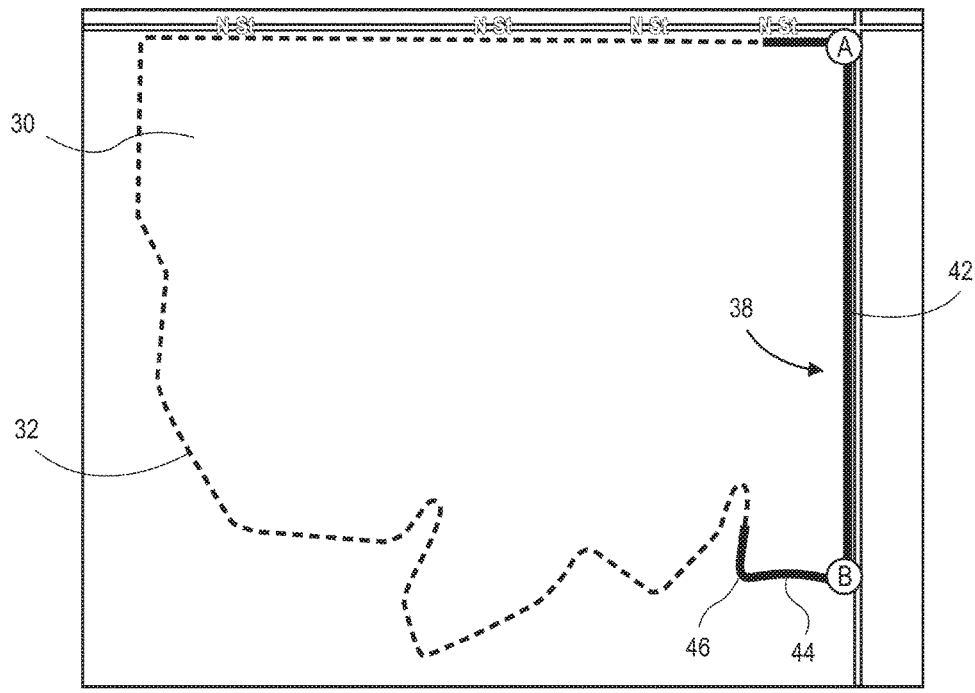
Figure 9:
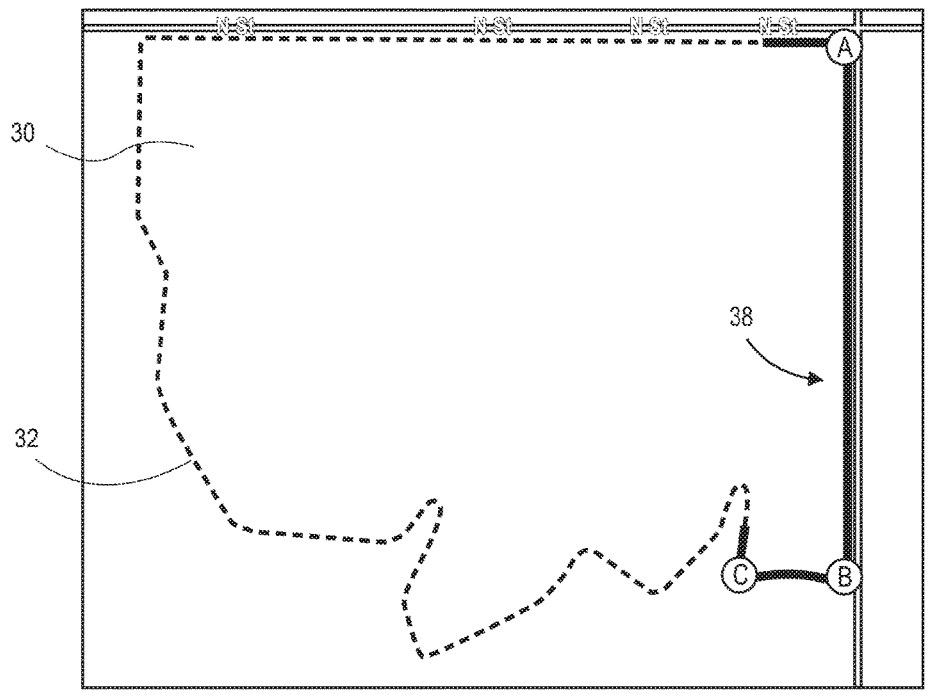
Figure 10:
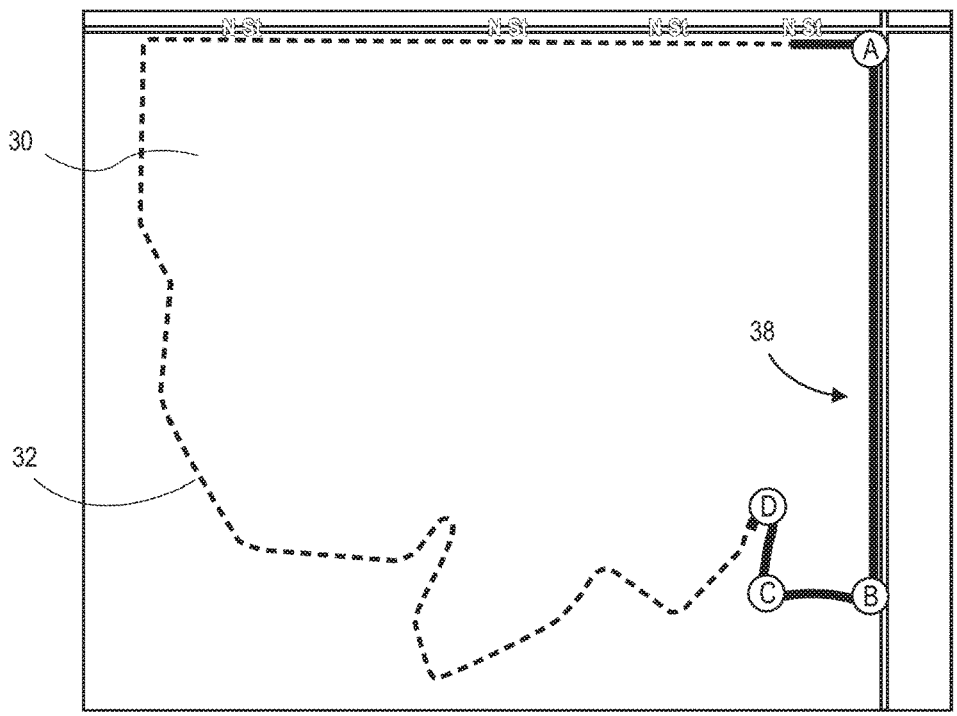

The tractor 10 proceeds along a second path segment 42 from waypoint A toward the bottom of FIGS. 4 and 5. The system 14 uses position information from the position determining device 18 to monitor the tractor's position and heading. When the tractor 10 reaches the end of the segment 42 and turns, as illustrated in FIG. 6, the system 14 detects a change in the tractor's heading, identifies a turn, and places a second waypoint—waypoint B—at the intersection of the two segments 42, 44, as illustrated in FIG. 7. The tractor 10 proceeds along the third segment 44 until the operator makes another turn at corner 46, as illustrated in FIG. 8, wherein the controller 16 detects the turn and places a third waypoint—waypoint C—at the location of the turn 46, as illustrated in FIG. 9. A fourth waypoint, waypoint D, is placed according to the same procedure, as illustrated in FIG. 10.

Figure 11:
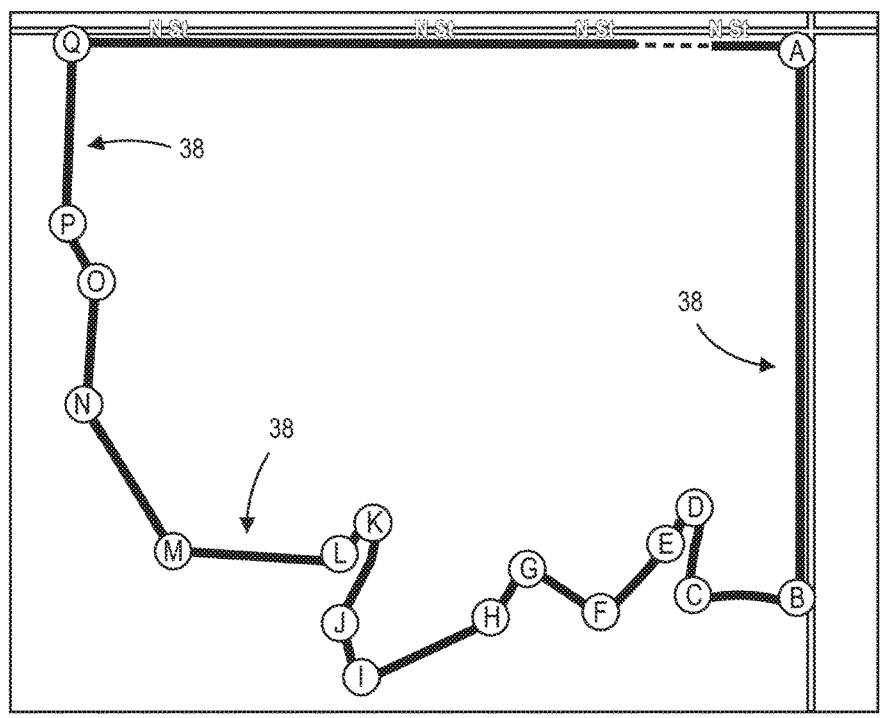

As the tractor 10 travels the intended path 32, the system 14 continues automatically placing waypoints at the various turns or corners of the path 32 until the tractor 10 completes the path. FIG. 11 illustrates the path nearly complete with waypoints A through Q placed on the path. In various embodiments of the invention, the system 14 places the waypoints on the path automatically. Thus, as the operator drives the tractor 10 along the path he or she does not need to interact with the user interface 20 or otherwise take any steps to create the waypoints A through Q. This allows the operator to focus on other aspects of machine operation, including steering, while the system 14 places the waypoints. When the operator completes the path 38 he or she may review the suggested waypoints and select a wayline based on one or more of the suggested waypoints.

The system 14 may identify corners or turns in the path 38 as turns corresponding to a radius of curvature that is less than a predetermined turn radius, such as fifty feet, seventy-five feet or one hundred feet. Arcuate portions of the path 38 with larger radii of curvature may be considered a curved path segment.

The system 14 presents the waypoints A through Q to the operator as suggested waypoints. In the illustrated embodiment, the system 14 presents a graphical depiction of the field 30, the path 38 travelled by the tractor, and the plurality of suggested waypoints A-Q via a display associated with the user interface 20. The intended path 32 is depicted in the drawings for illustration only and will typically not be presented to the operator via the user interface 20, as explained above. The system 14 then receives waypoint information from the user via the user interface 20, wherein the waypoint information includes waypoints selected by the user for automatic guidance. By way of example, the user may submit waypoint information by physically touching a touchscreen at locations corresponding to the waypoints the user desires to select. Input devices other than touchscreens may be used.

Figure 12:
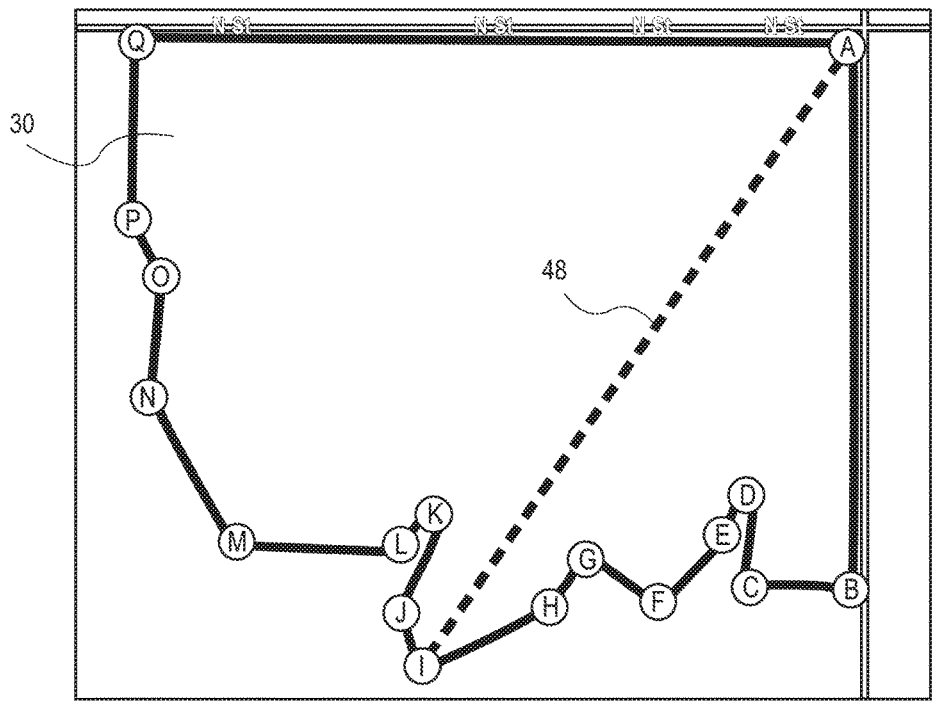
FIG. 12 illustrates an exemplary wayline corresponding to two of the waypoints of the path of FIGS. 3-11.
Figure 13:
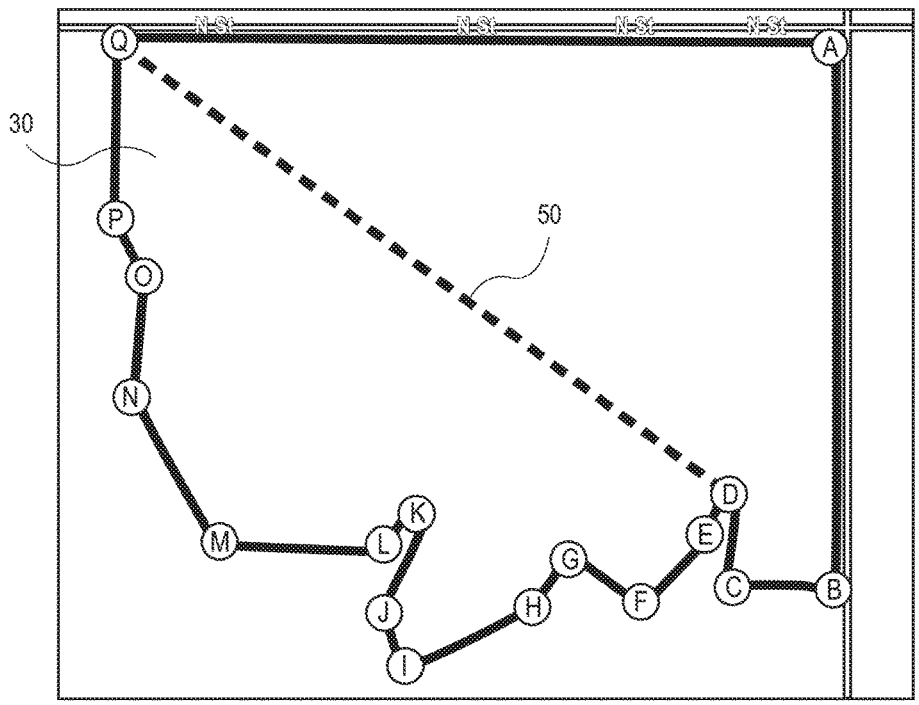
FIG. 13 illustrates another exemplary wayline corresponding to two of the waypoints of the path of FIGS. 3-11.

With reference to FIG. 12, if the user selects suggested waypoints A and I for automatic guidance, the system 14 may respond by generating a wayline 48 connecting waypoints A and I. The wayline 48 may then be used by the system 14 for automatic guidance of the tractor 10 as it works the field 30. Because the system 14 generates multiple suggested waypoints, the operator may select any of the waypoints to use for automatic guidance. Rather than selecting waypoints A and I for automatic guidance, for example, the operator may select waypoints D and Q, as illustrated in FIG. 13, wherein the system 14 may generate a wayline 50 corresponding to those waypoints.

Figure 14:
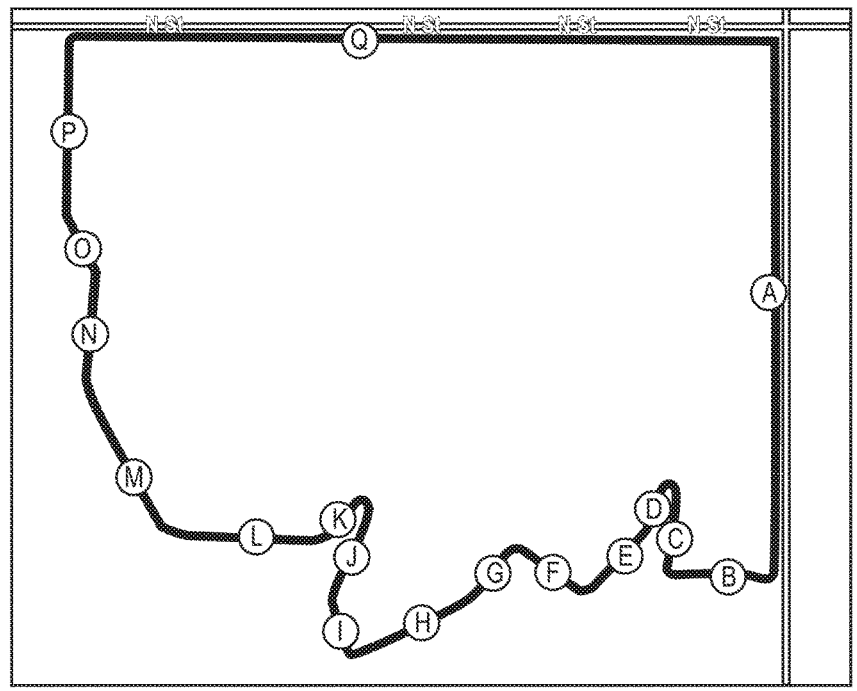
FIG. 14 is an exemplary screenshot similar to those of FIGS. 3-11, illustrating the path with a plurality of waypoints placed according to another placement scheme.

In the implementation illustrated in FIGS. 3-11 the system 14 automatically places the suggested waypoints at corners or turns of the path 38 travelled by the tractor 10. The invention is not so limited and the system 14 may place suggested waypoints according to other features of the travelled path 38. In another exemplary implementation, the system 14 automatically places the suggested waypoints at intermediate points along the path segments rather than at corners or segment endpoints. The system 14 may place the waypoints at segment midpoints, for example, as illustrated in FIG. 14. The system 14 may place the suggested waypoints at any intermediate point of the various path segments, wherein the intermediate point may corresponding to a percentage of the distance from a first end of each segment to another, as explained above.

In other situations it may be desirable to place the suggested waypoints according to path features unrelated to path segments. A substantially arcuate outer boundary of a field, for example, may not have segments easily defined by corners or endpoints. In such a situation the system 14 may place the suggested waypoints at locations associated with, for example, a total distance travelled by the tractor 10, wherein the system 14 automatically places waypoints along the path at predetermined total travel distance intervals, such as one hundred yards or two hundred yards, or fractions of the total distance of the travelled path calculated once the path is completed by the tractor 10. Alternatively, the system 14 may place the suggested waypoints according to the orientation of the tractor 10 relative to a cardinal direction, such as north. These are but a few examples.

In other embodiments of the invention, the system 14 places the suggested waypoints according to schemes unrelated to features or characteristics of the path itself. By way of example, such schemes may relate to geographic features of the land surrounding and/or associated with the path, historic practices or trends, or other factors.

Figure 15:
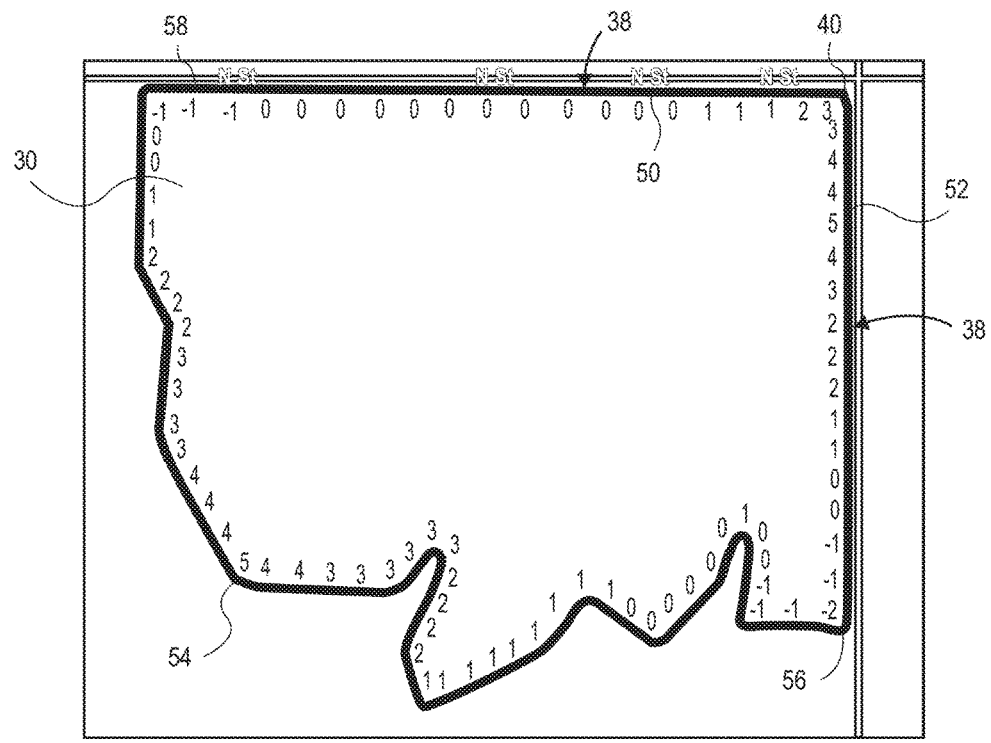
FIG. 15 is an exemplary screenshot similar to those of FIGS. 3-11, illustrating surface elevation values placed along the path.

An exemplary geographic feature of the land that may be used by the system to place suggested waypoints is surface elevation. It may be desirable, for example, to set the automatic guidance features of the invention to guide the tractor 10 to work the field 30 according to an inclination of the field surface, which may be estimated using the surface elevation of the field 30. With reference to FIG. 15, as the tractor 10 travels the path 38 the system 14 collects elevation data, associates elevation data with each location of the tractor 10, and stores the elevation data.

If the tractor 10 begins travelling the path 38 at location 50, for example, the system 14 may assign an initial elevation value of "0" to that location regardless of the actual surface elevation—thus, the elevation value may be a relative value unrelated to actual elevation. As the tractor 10 travels along the path 38 from the location 50 toward the corner 40 in FIG. 15, the surface elevation of the field 30 increases and the system 14 assigns an elevation value of "1" and then "2" as the tractor 10 approaches the corner 40. At the corner 40 the elevation has increased to "3." Each of the elevation values may correspond to a difference in elevation between a current location and the location 50 and may be expressed as a number of feet or number of meters. As the tractor 10 continues travelling the path 38 the system 14 assigns elevation values to points along the path, detecting changes in elevation and assigning elevation values accordingly.

Figure 16:
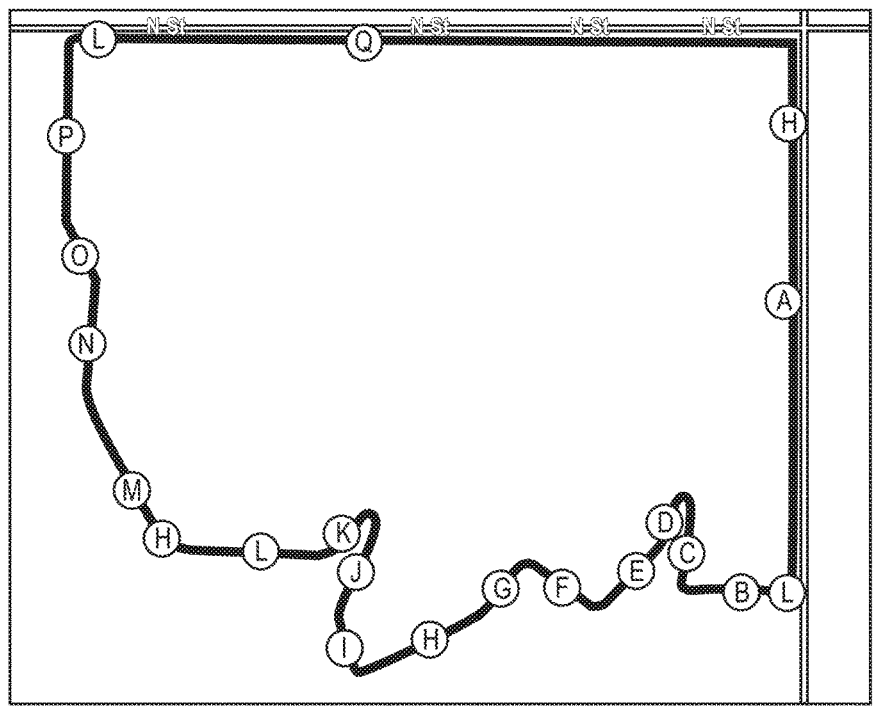
FIG. 16 is an exemplary screenshot similar to the screenshot of FIG. 11, illustrating a plurality of suggested waypoints placed on the path by the guidance system including a pair of waypoints labeled "H" corresponding to high elevation points and a pair of waypoints labeled "L" corresponding to low elevation points.

It can be seen from FIG. 15 that the highest points of elevation along the path correspond approximately to locations 52 and 54, which were each assigned a value of five. Similarly, it can be seen that the lowest points of elevation correspond to those with values of −1 and −2. The system 14 may automatically generate a pair of suggested waypoints corresponding to locations 52 and 54, and label those waypoints with an "H" to indicate to the operator that those waypoints correspond to the highest points of elevation of the path 38. The system may also automatically generate a pair of suggested waypoints corresponding to locations 56 and 58, and label those waypoints "L" to indicate to the operator that those waypoints correspond to the lowest points of elevation of the path. The waypoints labeled "H" and "L" may be presented to the operator along with other waypoints, as illustrated in FIG. 16.

The operator may select the waypoints labeled "H" for a wayline that corresponds to the highest elevation of the field, or may select the waypoints labeled "L" for a wayline that connects the lowest points of the field on opposite sides of a ridge. Assuming that a straight line intersecting locations 52 and 54 represents a ridge in the field, a wayline intersecting those two locations would allow the tractor to work the field along lines that are parallel with the ridge. Similarly, a wayline intersecting locations 56 and 58 would allow the tractor 10 to work the field 30 along lines that are perpendicular to the ridge. The operator's preference for one of the two waylines (or an entirely different wayline) may depend on the operation being performed and the type of machine used to perform the operation. In the two above examples, the operator intends to work the field along paths that are parallel with or perpendicular to a direction of changing elevation of a surface of the field 30. The operator may desire to use the elevation information in other ways when selecting waypoints.

Figure 17:
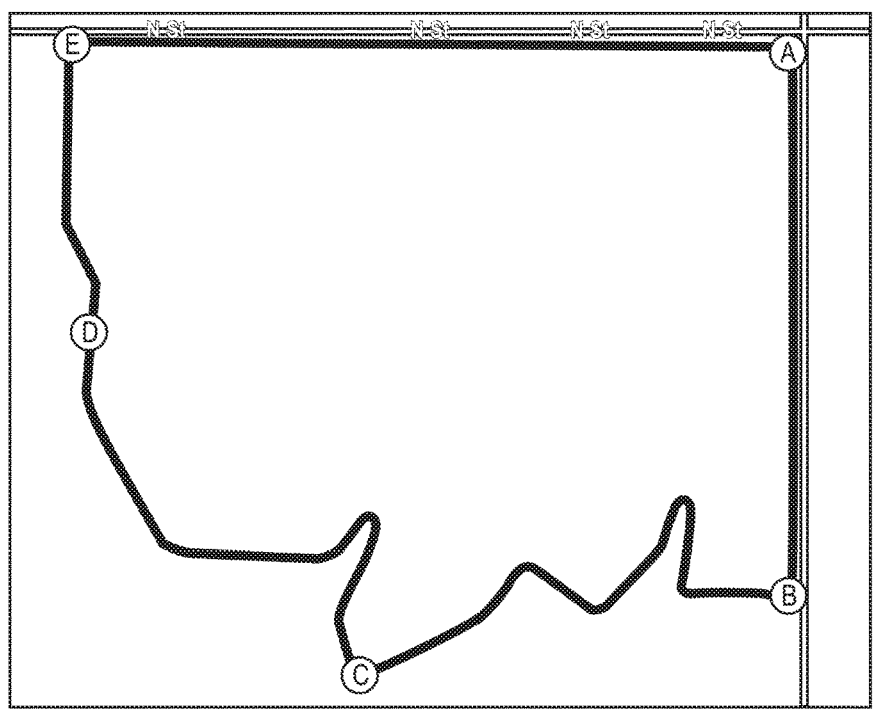
FIG. 17 is an exemplary screenshot similar to the screenshot of FIG. 11 illustrating a plurality of exemplary waypoints placed by the operator as the machine travelled the path.

In another embodiment of the invention, the operator manually places waypoints as the tractor 10 travels along the path 38. The operator may manually drive the path 38 and indicate positions of various waypoints along the path via the user interface 20 by, for example, pressing a button, engaging a touchscreen or making an audible sound detected by a microphone. An exemplary scenario of this embodiment is illustrated graphically in FIG. 17, wherein the operator selected waypoints A through E while travelling along the path 38. Using this embodiment of the invention, the user may identify a plurality of initial waypoints while travelling the path 38 and select one or more of the initial waypoints for use in automated guidance. A user may select, for example, any two of the initial waypoints A-E to define a wayline.

Figure 18:
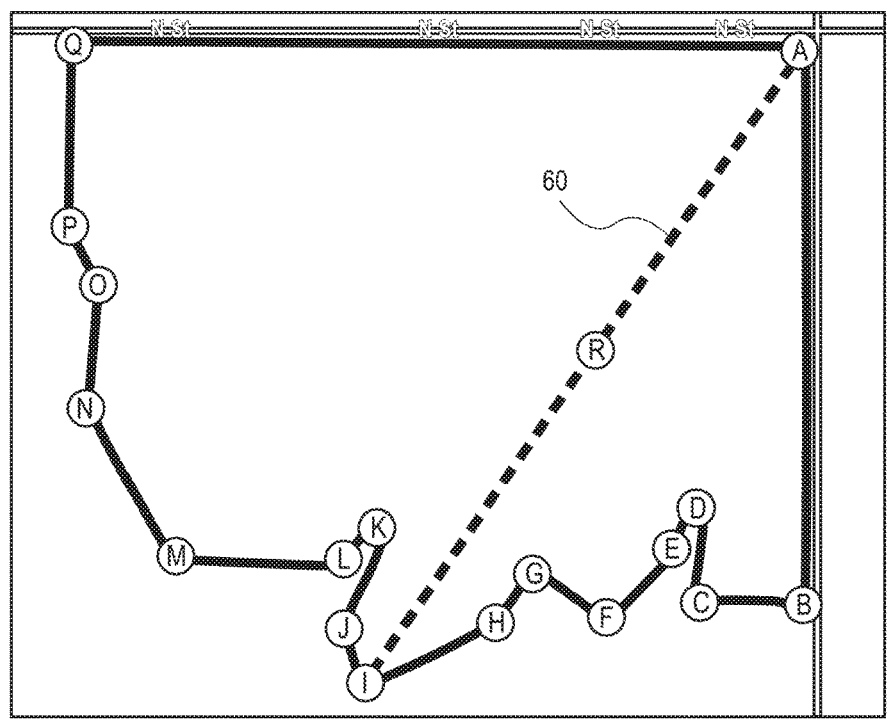
FIG. 18 is an exemplary screenshot similar to the screenshot of FIG. 11 illustrating a wayline corresponding to two of the waypoints placed along the path and a waypoint placed on the wayline.

With reference now to FIG. 18, once a wayline 60 is created according to any of the methods discussed herein, a waypoint may be placed on the wayline 60 either automatically by the system 14 or manually by the operator. Waypoint R, for example, may be placed automatically by the system 14 at any time after the wayline 60 is created, or may be placed manually by the operator. The system 14 may automatically place waypoint R at the midpoint of the wayline 60 (or any other intermediate point of the wayline) and then adjust a location of the waypoint in response to user input received via the user interface 20. Alternatively, the operator may manually place the waypoint by indicating a location on the wayline 60 via the user interface 20, or by indicating a location of the tractor 10 as the waypoint as the tractor 10 travels the wayline 60.

Figure 19:
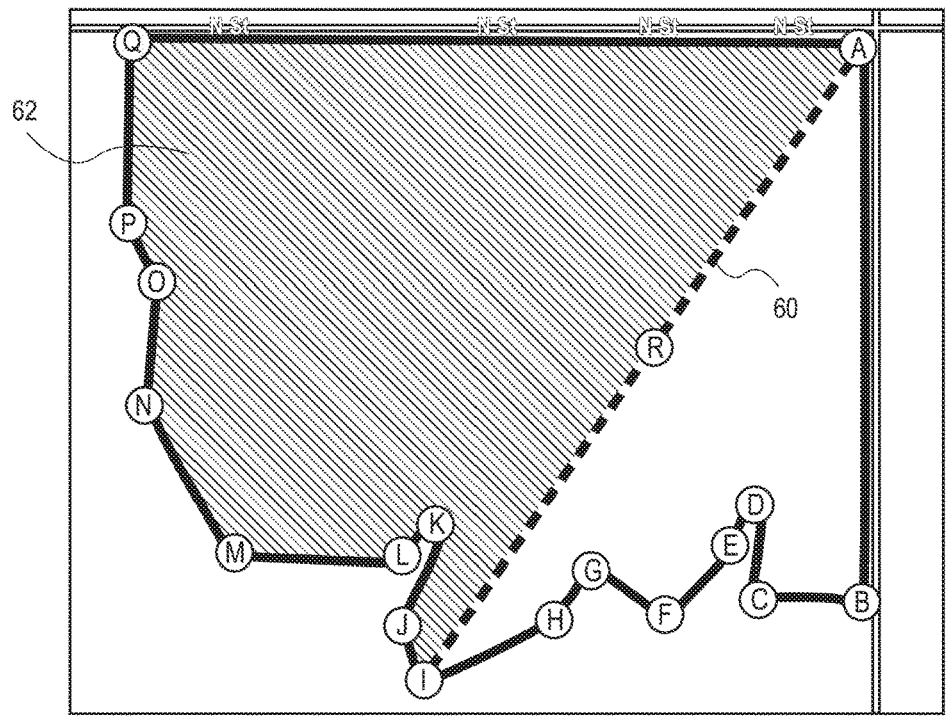
FIG. 19 illustrates the screenshot of FIG. 18 including a portion of the field worked by a machine.
Figure 20:
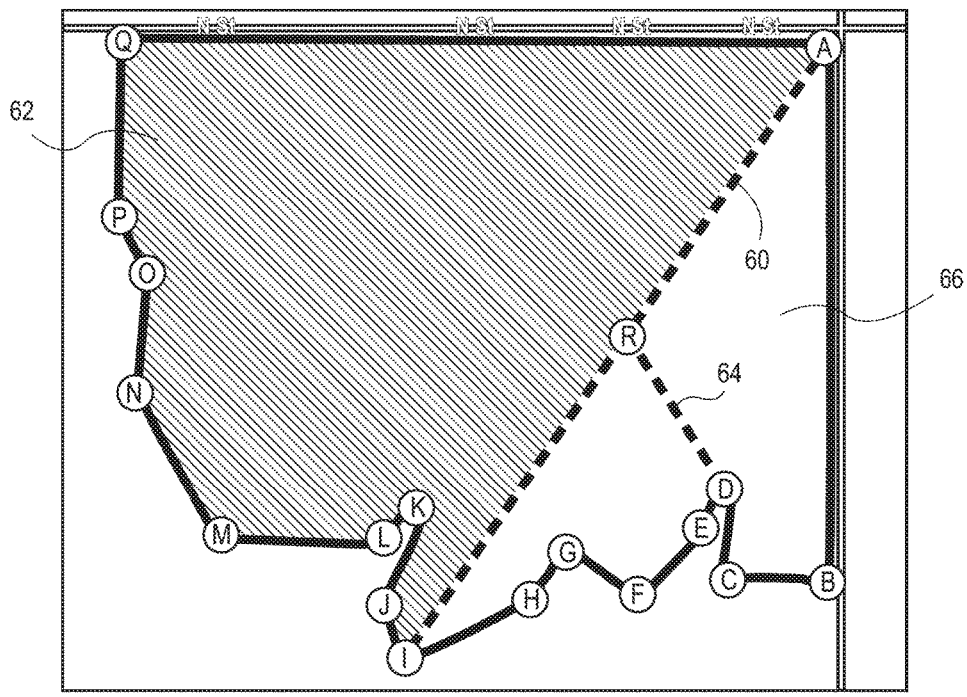
FIG. 20 illustrates the screenshot of FIG. 19 including an additional wayline corresponding to a waypoint on the path and a waypoint on the wayline.

The operator may use the waypoint R to generate a second wayline. The operator may choose to work a first portion 62 of the field using only the first wayline 60, as illustrated in FIG. 19, then create a second wayline 64 corresponding to waypoints R and D to work a second portion of the field 66, as illustrated in FIG. 20.

Figure 21:
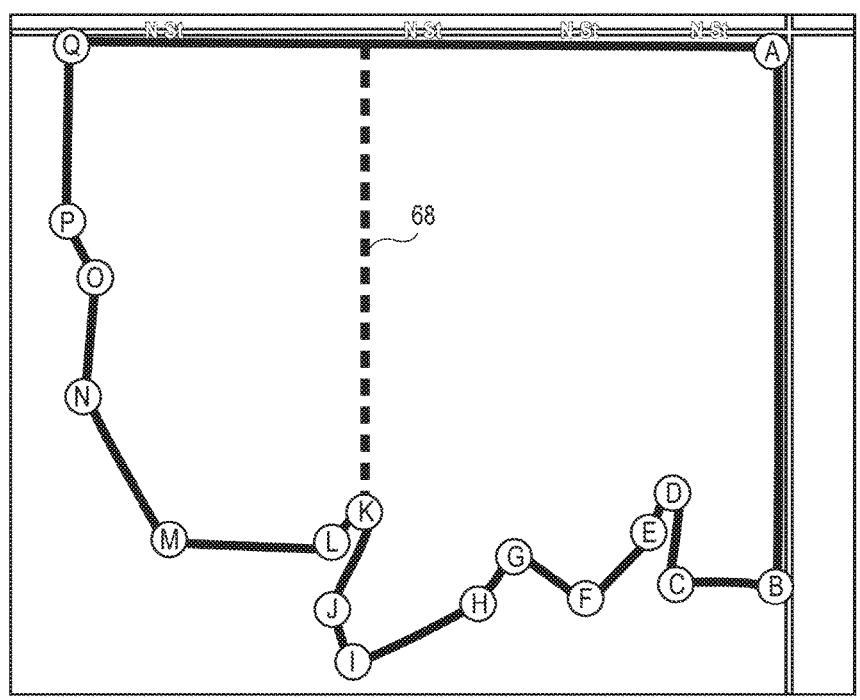
FIG. 21 is an exemplary screenshot similar to the screenshot of FIG. 11 including a wayline defined by one of the waypoints and a first direction.
Figure 22:
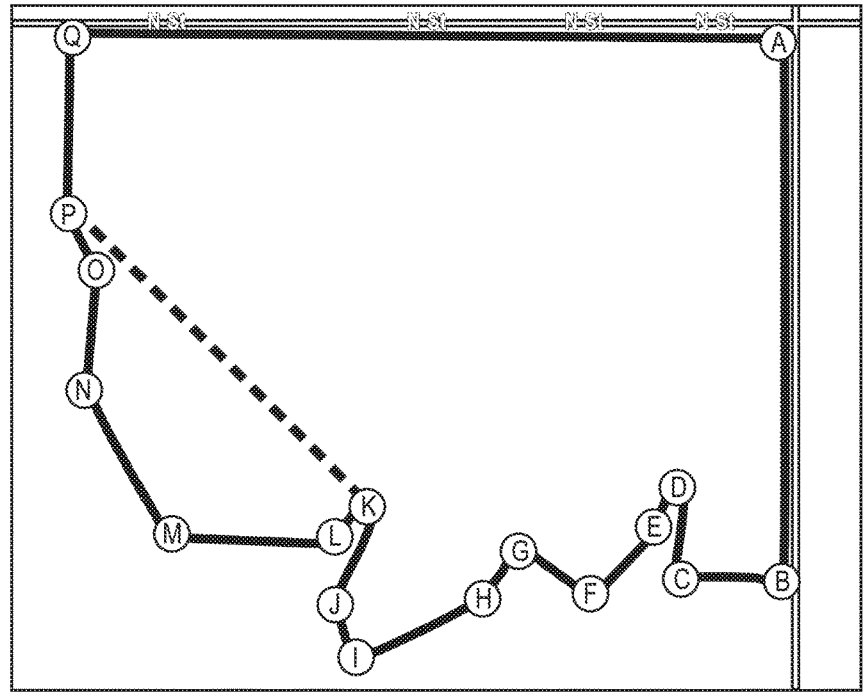
FIG. 22 illustrates the screenshot of FIG. 21, including the wayline rotated about the waypoint to a second direction.
Figure 23:
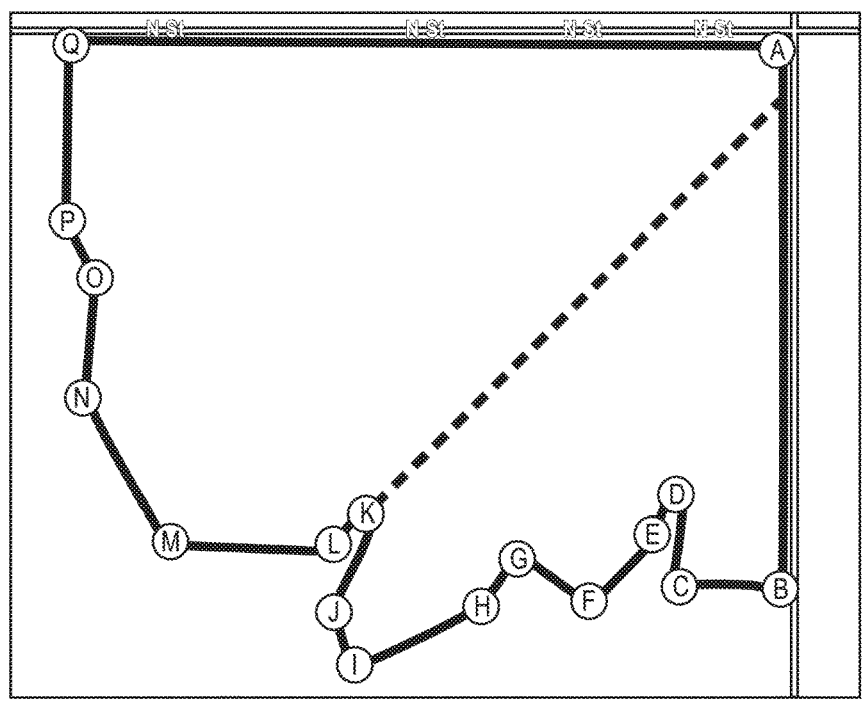
FIG. 23 illustrates the screenshot of FIG. 21, including the wayline rotated about the waypoint to a third direction.

The operator may select two waypoints to define a wayline, as explained above, or may select a single waypoint to define a wayline. In the latter scenario, the operator may select a single waypoint and then select an angle or orientation of a wayline intersecting the waypoint. With reference to FIG. 21, if the operator selects suggested waypoint K, the system 14 may generate a wayline 68 that intersects waypoint K and then present a graphical representation of the wayline 68 via the user interface 20. The generated wayline 68 may simply be parallel with one of the cardinal directions, such as north. The operator may then adjust an angle of the wayline 68 via the user interface 20. The wayline 68 is illustrated rotated counterclockwise in FIG. 22 and clockwise in FIG. 23. By way of example, the operator may adjust the wayline 68 by pressing a tactile or virtual button, rolling a dial, or "dragging" the wayline on a touchscreen by touching the screen and moving a finger across the touchscreen.

Figure 24:
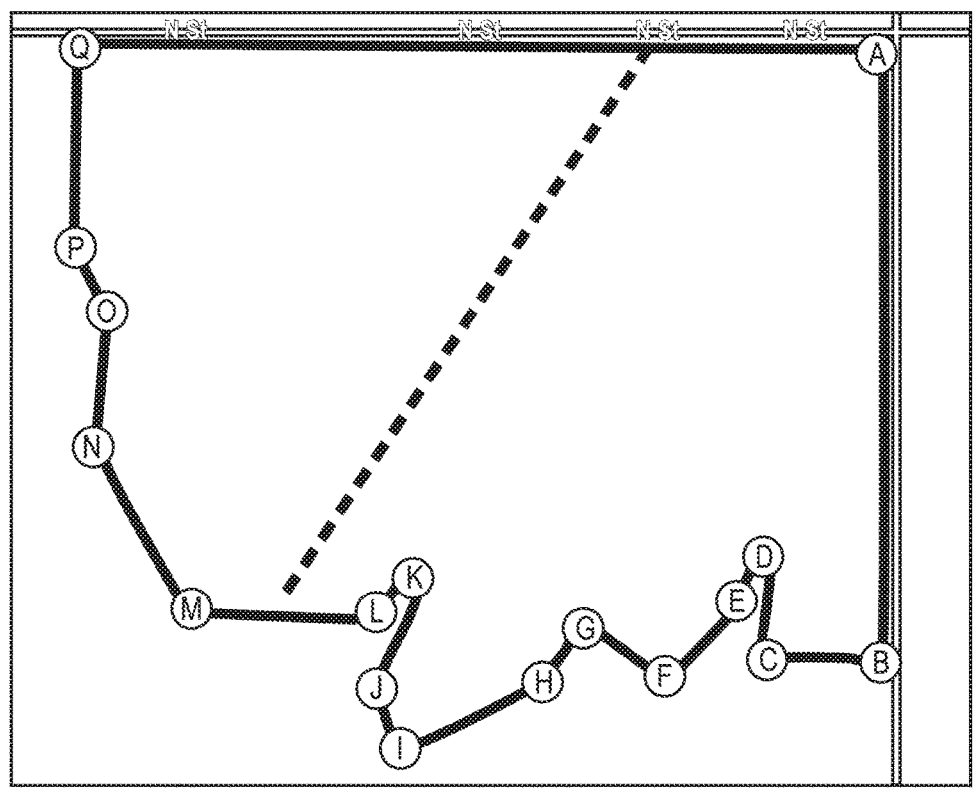
FIG. 24 illustrates the screenshot of FIG. 23, including the wayline shifted relative to the original position.

Regardless of whether the operator selects two waypoints to define the wayline or a single waypoint, the operator may adjust the angle of the wayline. Similarly, in ether scenario the operator may adjust a position of the wayline by moving the wayline side to side or up and down without rotating the wayline. As illustrated in FIG. 24, a wayline that initially intersected waypoint K may be moved to the left. Thus, by rotating and moving a wayline left, right, up and down the operator may reposition the wayline to any position in the field. Furthermore, a primary wayline, secondary wayline or both may be so adjusted.

In other embodiments of the invention, the system 14 may receive or retrieve data defining a boundary of the field or area to be worked, thereby relieving the operator of the need to travel a path defining an area to be worked before working the area. This may be desirable where the operator wishes to work the perimeter of the field last, such as in tillage operators that render the surface rough and the operator wishes to work the headland last so that the headland surface is smooth during headland maneuvering. Rather than driving the path 38, for example, the operator may direct the system 14 to retrieve data defining the path 38. Once the path 38 is defined by the system 14, waypoints and waylines may be suggested, selected and/or adjusted substantially as explained above. As used herein, the system 14 is configured to receive boundary information if the system 14 is configured to retrieve the boundary information from a memory or storage device, if the system 14 is configured to receive the information from one of the input/output port, or if the system 14 is configured to receive the boundary information from another computing device via a network.

Although the invention has been described with reference to the preferred embodiment illustrated in the attached drawing figures, it is noted that equivalents may be employed and substitutions made herein without departing from the scope of the invention as recited in the claims. While the waypoints are illustrated on the path 38, for example, it will be appreciated that the waypoints may be placed proximate or adjacent to the path 38. Such a configuration is within the ambit of the present invention.

Having thus described the preferred embodiment of the invention, what is claimed as new and desired to be protected by Letters Patent includes the following:

1. A guidance system for a mobile machine, the system comprising:
   a location determining device for determining a location of the machine;
   a user interface; and
   a controller configured to—
      receive location information from the location determining device,
      detect a first path followed by the machine using the location information, the first path including a plurality of turns and defining a work area within the first path,
      present a plurality of preliminary waypoints to a user via the user interface, the preliminary waypoints being associated with the first path,
      receive waypoint information from the user via the user interface indicating one or more selected waypoints corresponding to one or more of the preliminary waypoints, and
      automatically guide the machine using the one or more selected waypoints to define a second path that is different than the first path and within the work area defined by the first path.

2. The guidance system as set forth in claim 1, each of the preliminary waypoints corresponding to a different location on the path.

3. The guidance system as set forth in claim 1, the controller configured to automatically generate the plurality of preliminary waypoints and present the suggested waypoints to the user as the machine travels the path.

4. The guidance system as set forth in claim 1, the controller configured to automatically generate the preliminary waypoints to correspond to features of the path.

5. The guidance system as set forth in claim 4, the controller configured to automatically generate the preliminary waypoints such that each waypoint corresponds to a turn in the path.

6. The guidance system as set forth in claim 5, the controller configured to automatically generate the preliminary waypoints such that each waypoint corresponds to a turn in the path defined by a turn radius less than a predetermined turn radius.

7. The guidance system as set forth in claim 3, the controller configured to automatically generate the preliminary waypoints such that the waypoints correspond to predetermined intermediate points of path segments, each path segment being a portion of the path between consecutive turns.

8. The guidance system as set forth in claim 1, the controller configured to automatically generate the preliminary waypoints according to historical information relating to guidance patterns used to work the field previously.

9. The guidance system as set forth in claim 1, the controller configured to present the preliminary waypoints to the user as points on a visual representation of the path.

10. The guidance system as set forth in claim 9, the user interface including a touchscreen and configured to—
    present the visual representation of the path on the touchscreen, and
    receive the waypoint information from the user as the user touches the suggested waypoints on the touchscreen.

11. The guidance system as set forth in claim 1, the controller configured to simultaneously adjust the position of all of the waypoints in response to receiving a user input via the user interface.

12. The guidance system as set forth in claim 1, the controller further configured to allow the user to adjust a selected waypoint by changing a location of the waypoint.

13. The guidance system as set forth in claim 1, the controller configured to automatically guide the machine according to the one or more selected waypoints by generating a wayline corresponding to the one or more selected waypoints and guiding the machine along paths that are parallel with the wayline.

14. The guidance system as set forth in claim 13, the controller configured to receive wayline adjustment information from the user via the user interface and adjust the wayline according to the wayline adjustment information.

15. The guidance system as set forth in claim 1, the controller configured to automatically generate the preliminary waypoints according to geographic features of land associated with the path.

16. The guidance system as set forth in claim 15, the geographic features including surface elevation features.

17. The guidance system as set forth in claim 1, the controller configured to—
   generate a first wayline corresponding to the one or more selected waypoints,
   automatically generate a waypoint on the first wayline, and
   automatically guide the machine using at least the waypoint on the first wayline.

18. The guidance system as set forth in claim 17, the controller configured to—
   generate a second wayline corresponding to the waypoint on the first wayline and at least one of the suggested waypoints, and
   automatically guide the machine using the second wayline.

19. An agricultural vehicle comprising:
   a location determining device for determining a location of the vehicle;
   a user interface including a display; and
   a controller configured to—
      receive location information from the location determining device,
      detect a first path followed by the agricultural machine using the location information, the first path including a plurality of turns and defining a work area within the first path,
      automatically generate a plurality of suggested waypoints associated with the first path as the vehicle travels the first path,
      present the suggested waypoints to a user as a visual representation on the display as the vehicle travels the first path,
      receive waypoint information from the user via the user interface, the waypoint information indicating two of the suggested waypoints as selected waypoints, and
      automatically guide the machine using the selected waypoints to define a second path that is different than the first path and within the work area defined by the first path.

20. The agricultural vehicle as set forth in claim 19, the display being a touchscreen display and the controller configured to receive the way point information from the user via the touchscreen.

* * * * *